US009277096B1

(12) United States Patent
Li et al.

(10) Patent No.: US 9,277,096 B1
(45) Date of Patent: Mar. 1, 2016

(54) VARYING TRAP THICKNESS IN AN IMAGE

(71) Applicant: XEROX CORPORATION, Norwalk, CT (US)

(72) Inventors: Xing Li, Webster, NY (US); Apurba Das, West Bengal (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/539,590

(22) Filed: Nov. 12, 2014

(51) Int. Cl.
*H04N 1/58* (2006.01)
*H04N 1/409* (2006.01)
*B41J 2/21* (2006.01)

(52) U.S. Cl.
CPC ............. *H04N 1/4092* (2013.01); *B41J 2/2132* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 6,509,903 B1 * | 1/2003 | Yosefi | ...... | H04N 1/58 345/597 |
| 6,654,145 B1 * | 11/2003 | Speck | ...... | H04N 1/58 358/1.9 |
| 7,187,471 B1 * | 3/2007 | Dermer | ...... | H04N 1/58 358/1.9 |
| 8,130,413 B1 * | 3/2012 | Pellore | ...... | G06K 15/1826 358/1.15 |
| 8,253,981 B2 * | 8/2012 | Eguchi | ...... | H04N 1/58 358/1.9 |
| 9,135,535 B1 * | 9/2015 | Das | ...... | G06K 15/1826 |

* cited by examiner

*Primary Examiner* — Paul F Payer
(74) *Attorney, Agent, or Firm* — MH2 Technology Law Group LLP

(57) ABSTRACT

A method for varying a thickness of a trap around an object in an image. The method may include selecting a first window along a border of the object. The first window includes one or more first pixels representing the object and one or more second pixels representing a background or another object. A first edge orientation direction is determined based at least partially upon a location of the one or more first pixels in the first window. A first thickness of the object is measured along the first edge orientation direction. A trap is created around the object. A first thickness of the trap proximate to the first window is varied based at least partially upon the first thickness of the object.

20 Claims, 8 Drawing Sheets

VARYING TRAP THICKNESS IN AN IMAGE

TECHNICAL FIELD

The present teachings relate generally to printing an image and, more particularly, to systems and methods for varying a trap width or thickness around an object in a printed image.

BACKGROUND

When printing with a color inkjet printer, all colors are applied to the paper at once. Each color generally ends up where it is expected. When printing with a commercial printing press, a document consisting of more than one color of ink requires that the single page pass through the printing press multiple times as each color is applied to the paper. Sometimes the paper or the plates applying the ink may shift. It may be a tiny shift but sufficient to be noticeable. For example, a white gap may appear between a letter of a first color (e.g., yellow) that is supposed to be touching a box of a second color (e.g., blue). When this happens, the color is said to be out-of-register. Color-to-color misregistration refers to misregistration between color separations in a printed image. Such misregistration in printed halftoned images may result in image defects, a primary one being white gaps between color edges.

A trapping filter may be used to address the misregistration in the image by introducing a perceptually dominant third color. The trapping filter may include a "trap" around the object that is the third color, which may be a mixture of the first two colors (e.g., green). Conventional traps have a uniform thickness. A uniform thickness may work well for orthogonal objects and objects with few irregularities. However, conventional trap filters do not account for the size (e.g., extension) of the object in non-orthogonal directions or irregularities in the object. What is needed is an improved trap filter that accounts for the size of the object in non-orthogonal directions and irregularities in the object.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for varying a thickness of a trap around an object in an image is disclosed. The method may include selecting a first window along a border of the object. The first window includes one or more first pixels representing the object and one or more second pixels representing a background or another object. A first edge orientation direction is determined based at least partially upon a location of the one or more first pixels in the first window. A first thickness of the object is measured along the first edge orientation direction. A trap is created around the object. A first thickness of the trap proximate to the first window is varied based at least partially upon the first thickness of the object.

A non-transitory computer-readable medium is also disclosed. The medium stores instructions that, when executed by at least one processor of a computing system, cause the computing system to perform operations. The operations include selecting a first window along a border of the object. The first window includes one or more first pixels representing the object and one or more second pixels representing a background or another object. A first edge orientation direction is determined based at least partially upon a location of the one or more first pixels in the first window. A first thickness of the object is measured along the first edge orientation direction. A trap is created around the object. A first thickness of the trap proximate to the first window is varied based at least partially upon the first thickness of the object.

A computing system is also disclosed. The computing system includes one or more processors and a memory system including one or more non-transitory computer-readable media storing instructions that, when executed by at least one of the one or more processors, cause the computing system to perform operations. The operations include selecting a first window along a border of the object. The first window includes one or more first pixels representing the object and one or more second pixels representing a background or another object. A first edge orientation direction is determined based at least partially upon a location of the one or more first pixels in the first window. A first thickness of the object is measured along the first edge orientation direction. A trap is created around the object. A first thickness of the trap proximate to the first window is varied based at least partially upon the first thickness of the object.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIGS. 4-1, 4-2, and 4-3 depict enlarged views of windows from FIG. 1, each including one or more pixels representing the object and one or more pixels representing the background, according to one or more embodiments disclosed. These pixels may be used to determine edge orientation directions.

FIGS. 7-1, 7-2, and 7-3 depict views of illustrative structuring elements that may be used in the image, according to one or more embodiments disclosed.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

As used herein, unless otherwise specified, the word "printer" encompasses any apparatus that performs a print outputting function for any purpose, such as a digital copier, bookmaking machine, facsimile machine, a multi-function machine, electrostatographic device, 3D printer that can make a 3D objects, etc. It will be understood that the structures depicted in the figures may include additional features not depicted for simplicity, while depicted structures may be removed or modified.

Figure 1:
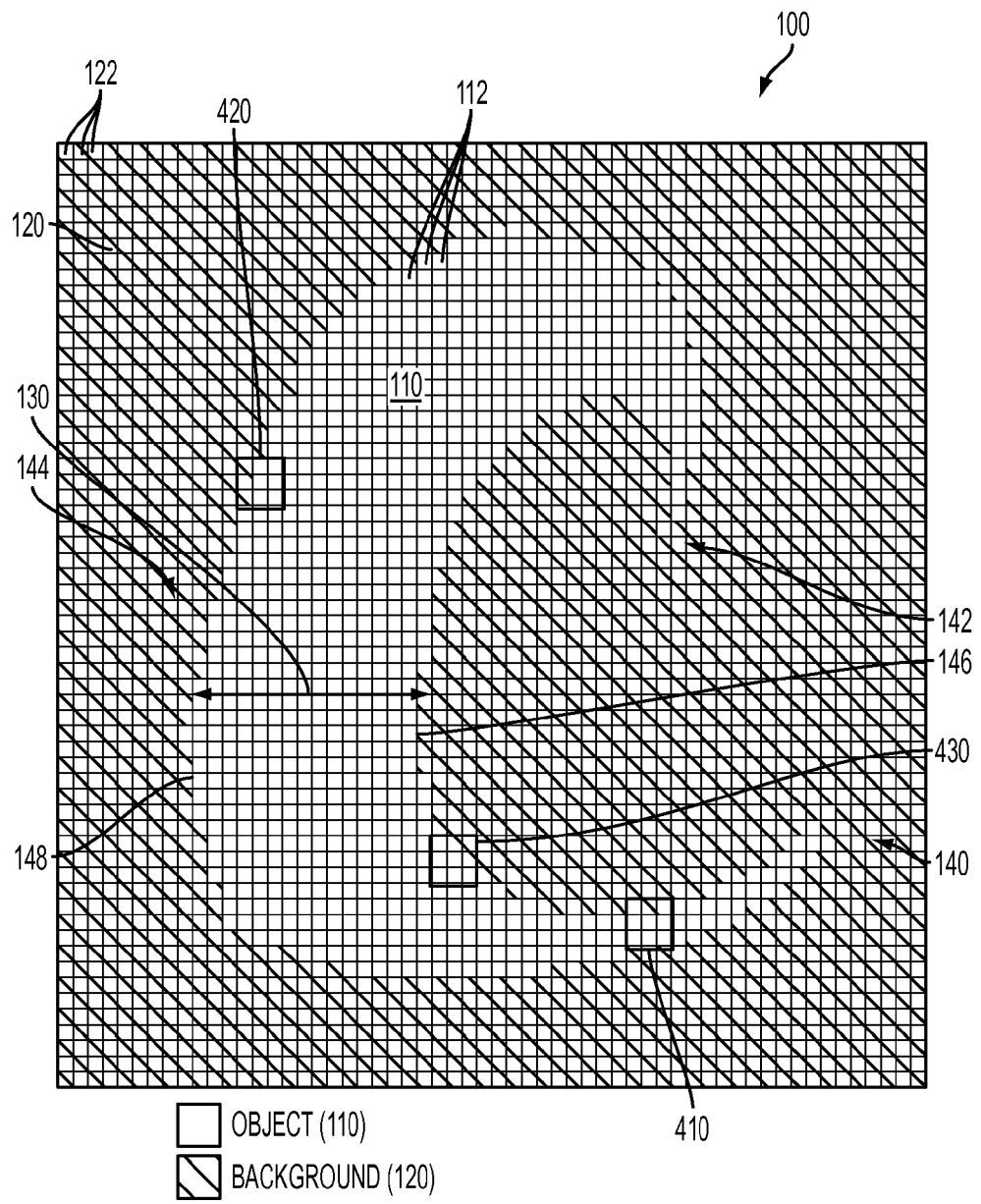
FIG. 1 depicts a view of an image including an object and a background, according to one or more embodiments disclosed.

FIG. 1 depicts a view of an image 100 including an object 110 and a background 120, according to one or more embodiments disclosed. The image 100 may include a plurality of pixels 112 that make up the object 110 and a plurality of pixels 122 that make up the background 120. The pixels 112 making up the object 110 may be a first color (e.g., yellow), and the pixels 122 making up the background 120 may be a second color (e.g., blue). The object 110 appears as a modified letter "C" in FIG. 1; however, this shape is merely illustrative, and other shapes are contemplated herein.

As may be seen, a thickness 130 of the object 110 varies. In the example shown, the thickness 130 of the object 110 may range from 1 pixel (e.g., proximate one or both ends 140, 142) to 16 pixels (e.g., proximate the central portion 144). In other examples, the thickness 130 may vary from 1 pixel to 20 or more pixels, 50 or more pixels, 100 or more pixels, or the whole page. As used herein, the term "thickness" may refer to the shortest distance from one side 146 of the object 110 (e.g., the inside of the "C") to another side 148 of the object 110 (e.g., the outside of the "C"). As such, the thickness 130 may be measured at any angle, and is not necessarily measured in an orthogonal direction.

Figure 2:
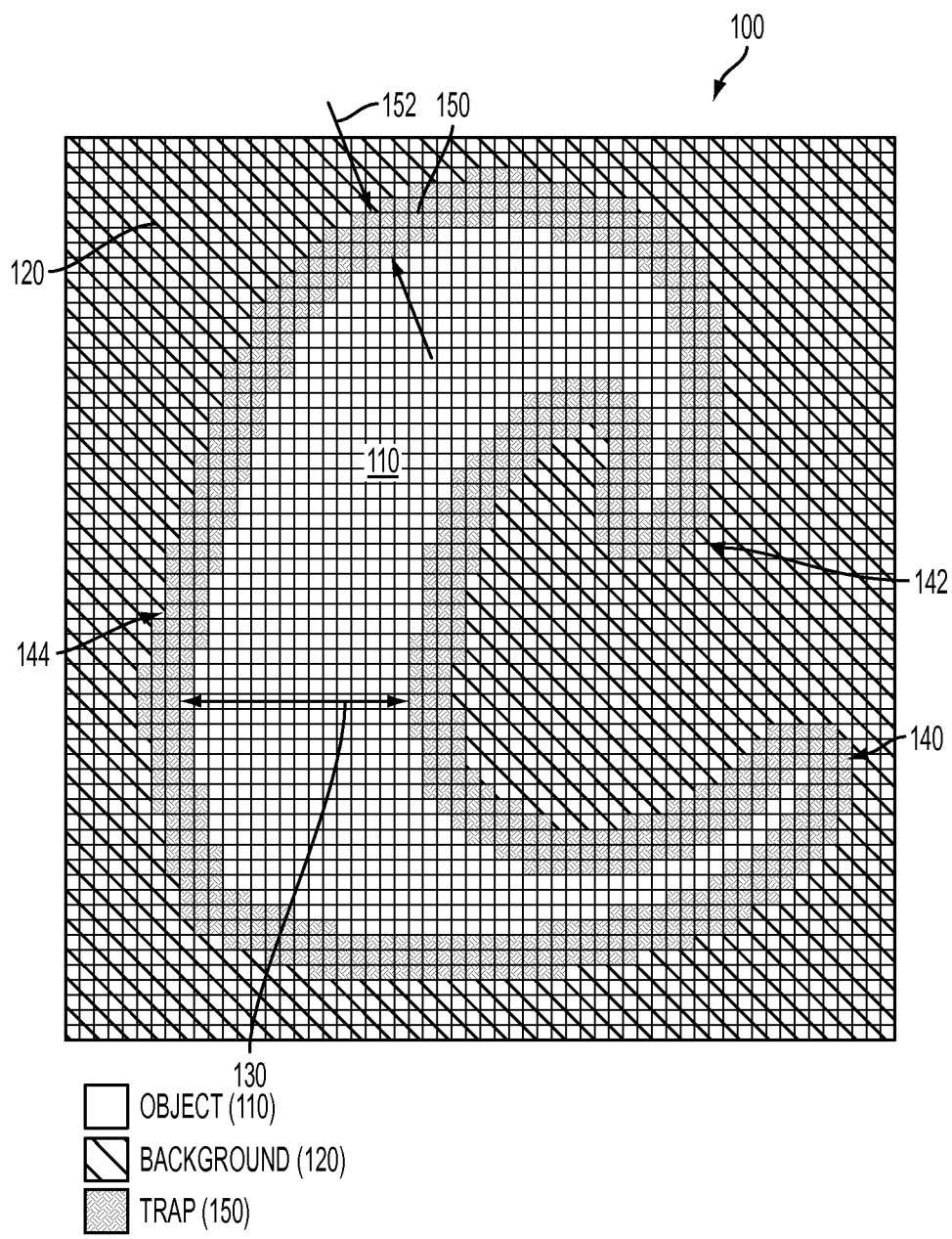
FIG. 2 depicts a view of the image with a trap having a uniform thickness around the object, according to one or more embodiments disclosed.

FIG. 2 depicts a view of the image 100 with a trap 150 having a uniform width or thickness 152 around the object 110, according to one or more embodiments disclosed. A user may select the thickness 152 of the trap 150, and this thickness 152 may be uniform around the border of the object 110. As shown in FIG. 2, the thickness 152 of the trap 150 is 3 pixels around the border of the object 110; however, in other embodiments, the user may select a greater or lesser thickness 152.

The thickness 152 of the trap 150 may be visually satisfactory at particular portions in the image 100 but not others. For example, the thickness 152 of the trap 150 may be visually satisfactory proximate to portions of the object 110 having a thickness 130 that is greater than or equal to 4 pixels (e.g., proximate to the central portion 144 of the object 110). However, the thickness 152 of the trap 152 may not be visually satisfactory proximate to portions of the object 110 having a thickness that is less than or equal to 4 pixels (e.g., proximate to the ends 140, 142). This is because the trap 150 may "overpower" the object 110 at points where the trap 150 has a greater thickness 152 than the object 110.

Figure 3:
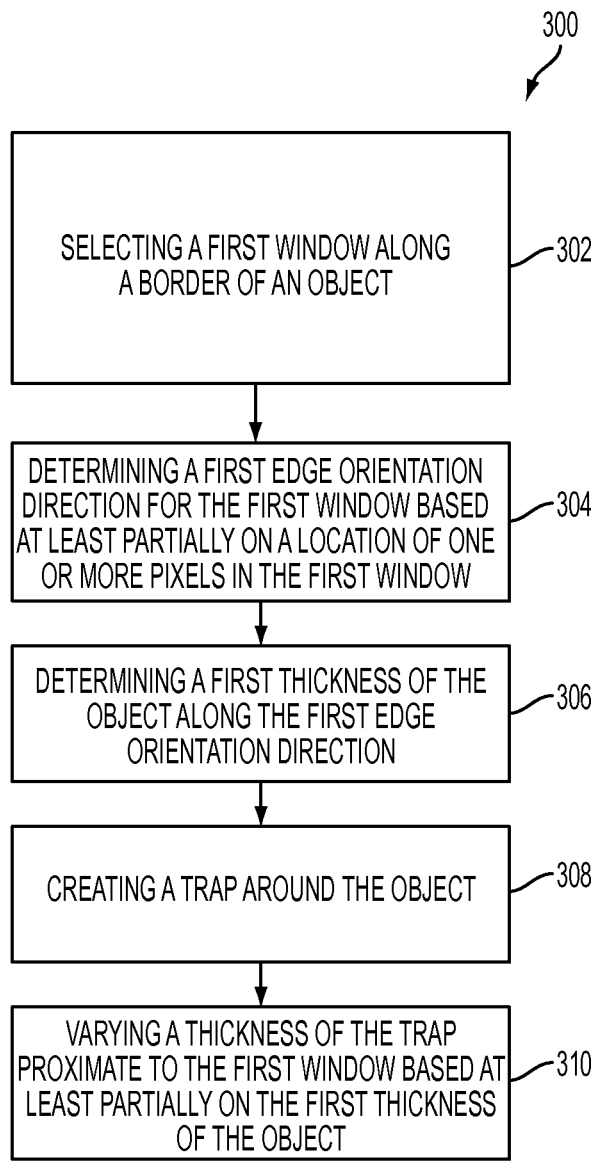
FIG. 3 depicts a flow chart of a method for varying a thickness of a trap around an object, according to an embodiment.

FIG. 3 depicts a flow chart 300 of a method for varying the thickness 152 of the trap 150 around the object 110, according to one or more embodiments disclosed. The method may adaptively vary the thickness 152 of the trap 150 by measuring the thickness 130 of the object 110 at a plurality of locations around the object 110 and combining this measurement data with a global thickness of the trap 150 specified by the user. The method may begin by selecting one or more windows along a border of the object 110 as at 302. This may be illustrated in more detail with respect to FIGS. 4-1, 4-2, and 4-3.

FIGS. 4-1, 4-2, and 4-3 depict enlarged views of windows 410, 420, 430 from FIG. 1, each including one or more pixels 112 representing the object 110 and one or more pixels 122 representing the background 120 (or another object), according to one or more embodiments disclosed. As shown, each window 410, 420, 430 includes an array of 9 pixels in a 3×3 orientation. However, as will be appreciated, the number of pixels 112, 122 and/or the orientation of the pixels 112, 122 may vary.

For each window 410, 420, 430, one or more edge orientation directions may be determined based at least partially upon the location of the one or more pixels 112, 122 in the window 410, 420, 430 (e.g., the pixels 112 representing the object 110, the pixels 122 representing the background 120, or a combination thereof), as at 304 in FIG. 3. The edge orientation direction may refer to a direction that is orthogonal to a portion of the border of the object 110 located within the particular window (e.g., window 410). In at least one embodiment, the edge orientation direction may be orthogonal to a majority of the surfaces of the pixels 112 that make up the border of the object 110 located within the particular window (e.g., window 410). The edge orientation direction may point into the object 110.

The edge orientation direction may be selected from a plurality of directions. In the embodiments shown in FIGS. 4-1, 4-2, and 4-3, there may be 8 possible edge orientation directions: (1) North, (2) South, (3) East, (4) West, (5) Northeast, (6) Northwest, (7) Southeast, and (8) Southwest. In other embodiments, there may be more or fewer edge orientation directions. The edge orientation directions may be implemented using a 256-entry 3-bit look-up table.

Figure 4:
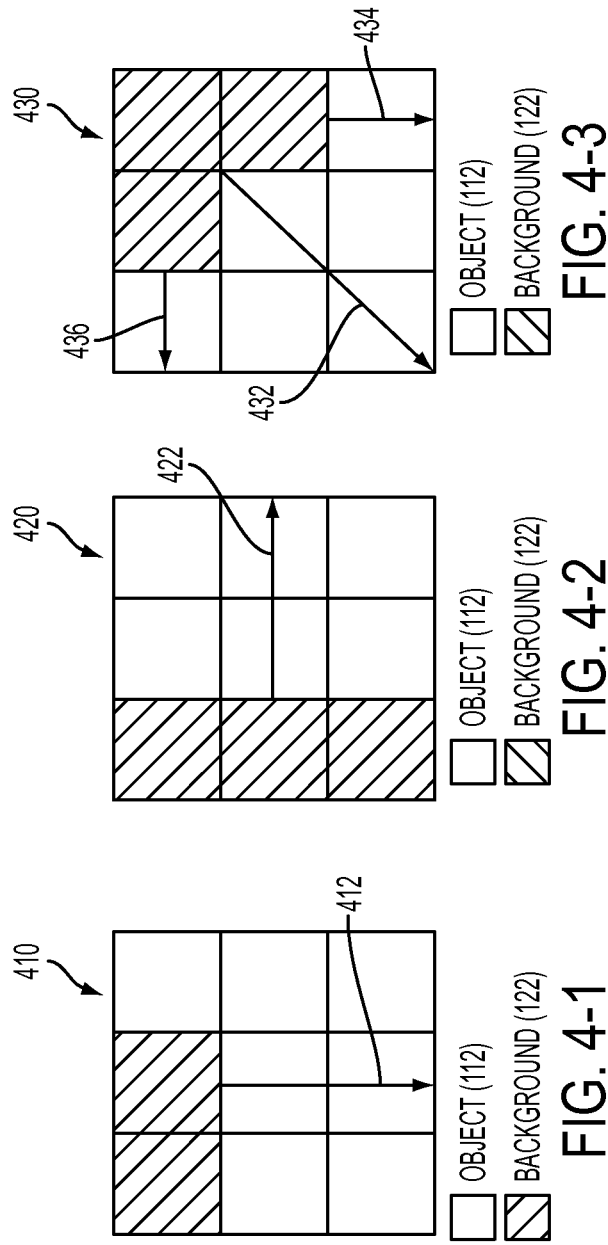

Referring now to FIG. 4-1, two of the pixels 122 represent the background 120, and seven of the pixels 112 represent the object 110. The two pixels 122 representing the background 120 are side-by-side in a horizontal configuration (e.g., East to West). Thus, as may be seen, a majority (e.g., two-thirds) of the surfaces of the pixels 112 that make up the border of the object 110 in the window 410 is in a horizontal configuration (e.g., East to West). A minority (e.g., one third) of the surfaces of the pixels 112 that make up the border of the object 110 in the window 410 is in a vertical configuration (e.g., North to South). As the edge orientation direction may (1) be orthogonal to the majority of the surfaces of the pixels 112 that make up the border of the object 110 and (2) point into the object 110, in this embodiment, the edge orientation direction 412 may be South.

Referring now to FIG. 4-2, three of the pixels 122 represent the background 120, and six of the pixels 112 represent the object 110. The three pixels 122 representing the background 120 are side-by-side in a vertical configuration (e.g., North to South). Thus, as may be seen, a majority (e.g., all) of the surfaces of the pixels 112 that make up the border of the object 110 in the window 420 is in a vertical configuration (e.g., North to South). As the edge orientation direction may (1) be orthogonal to the majority of the surfaces of the pixels 112 that make up the border of the object 110 and (2) point into the object 110, in this embodiment, the edge orientation direction 422 may be East.

Referring now to FIG. 4-3, three of the pixels 122 represent the background 120, and six of the pixels 112 represent the object 110. The three pixels 122 representing the background 120 are an "L-shaped" configuration. Thus, as may be seen, half (e.g., two) of the surfaces of the pixels 112 that make up the border of the object 110 in the window 430 are in a horizontal configuration (e.g., East to West), and half (e.g., two) of the surfaces of the pixels 112 that make up the border of the object 110 in the window 430 are in a vertical configuration (e.g., North to South).

When no majority exists, the edge orientation direction may be the average of a first edge orientation direction 434 and a second edge orientation direction 436. The first edge orientation direction 434 may be orthogonal to the first half of the border and point into the object 110. Thus, the first edge orientation direction 434 may be South. The second edge orientation direction 436 may be orthogonal to the second half of the border and point into the object 110. Thus, the second edge orientation direction 436 may be West. The average 432 of the first and second edge orientation directions 434, 436 here is Southwest.

Once the edge orientation directions 412, 422, 432 are determined at a plurality of locations around the object 110, the thickness 130 of the object 110 may be measured or determined along each edge orientation direction 412, 422, 432, as at 306 in FIG. 3. This may be illustrated in more detail with respect to FIG. 5.

Figure 5:
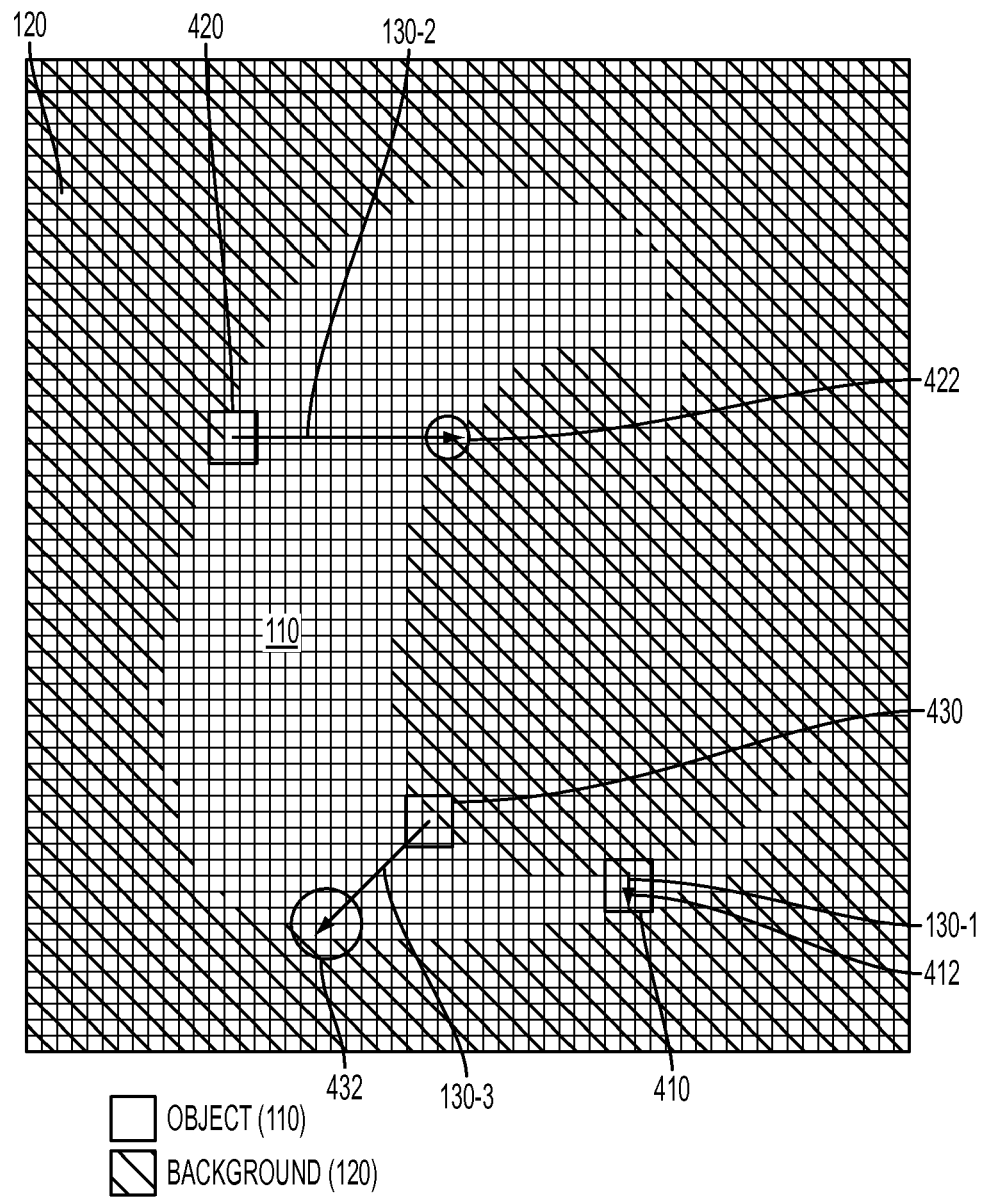
FIG. 5 depicts a view of the image showing local thicknesses of the object measured along the edge orientation directions, according to one or more embodiments disclosed.

FIG. 5 depicts a view of the image 100 showing thicknesses 130-1, 130-2, 130-3 of the object 110 being measured along the edge orientation directions 412, 422, 432, according to one or more embodiments disclosed. The thicknesses 130-1, 130-2, 130-3 may be measured by sampling the object 110 along the edge orientation directions 412, 422, 432 until a pixel in the background 120 is encountered, or until a predefined thickness is reached. As shown, one thickness (e.g., thickness 130-1) may be measured for each window (e.g., window 410), which in this illustrative example is three pixels wide. In another embodiment, a thickness may be measured for each pixel 112 along the border of the object 110. For example, the window 410 may have three thicknesses originating therefrom along the determined edge orientation direction 410.

As shown, the first thickness 130-1 (originating from the window 410) may be 2 pixels. The second thickness 130-2 (originating from the window 420) may be 15 pixels. The third thickness 130-3 originating from the window 430 may be 8 pixels (e.g., measured diagonally). 8 pixels measured diagonally may be equivalent to about 11.3 pixels measured in an orthogonal direction (e.g., North, South, East, West).

Although three thicknesses 130-1, 130-2, 130-3 are shown measured in FIG. 5, in other embodiments, more or fewer thicknesses may be measured based at least partially on the size of the object 110 and/or the length of the border around the object 110. For example, additional windows may be placed side by side around the border of the object 110, and a thickness measurement may originate from each window. In this example, the thickness measurements are spaced evenly around the border of the object 110 and spaced 3 pixels apart from one another. In another example, the edge orientation directions and thicknesses may be measured for each border pixel.

Once the thicknesses 130-1, 130-2, 130-3 of the object 110 are determined, the trap 150 may be created around the object 110, as at 308 in FIG. 3. This may be illustrated in more detail with respect to FIG. 6.

Figure 6:
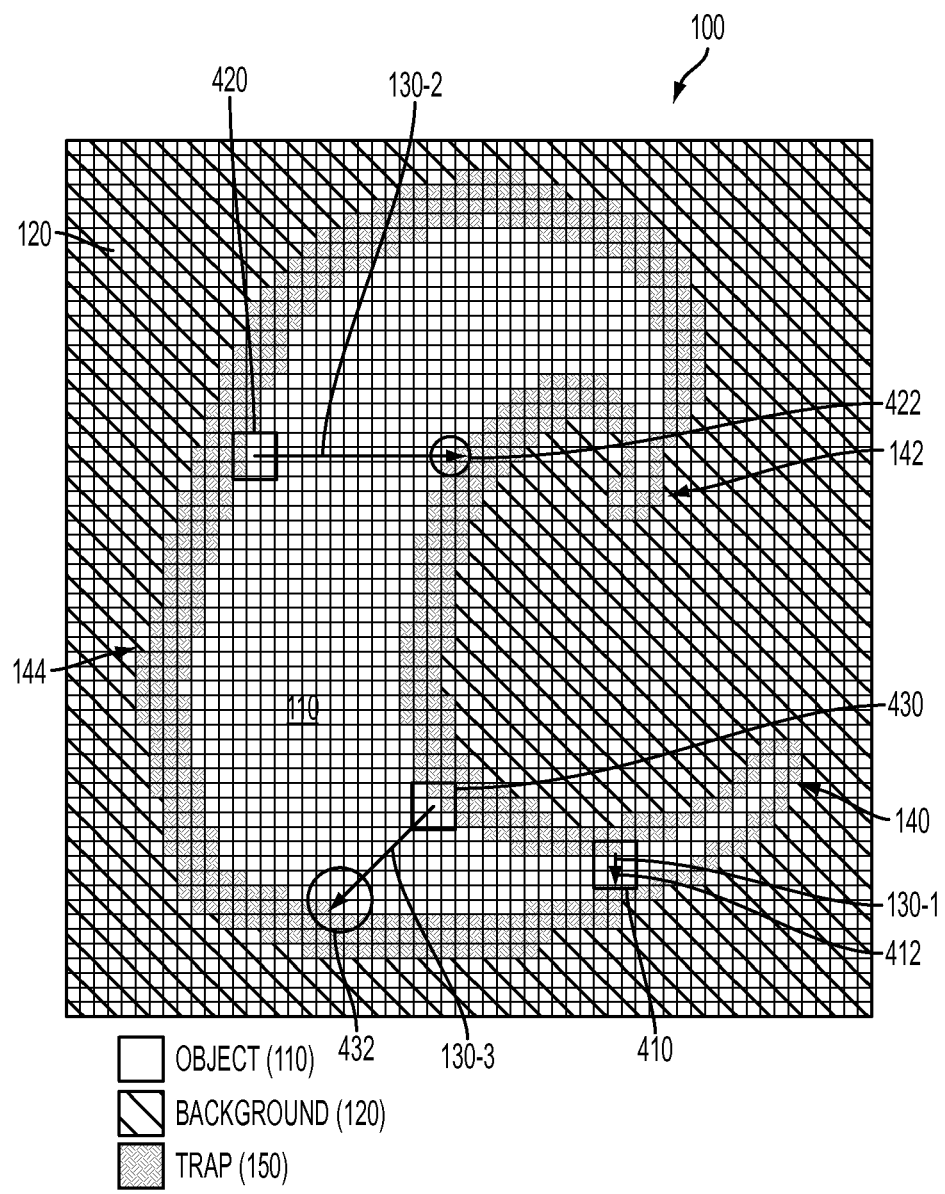
FIG. 6 depicts a view of the image with a trap having a varying thickness around the object, according to one or more embodiments disclosed.
Figure 7:
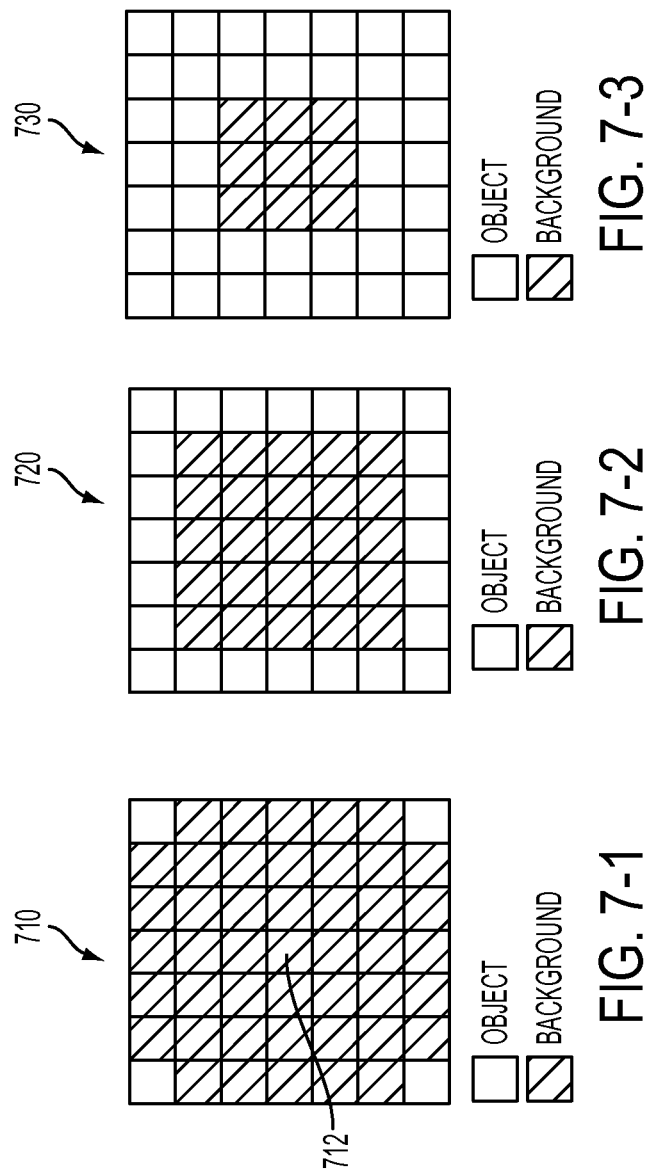

FIG. 6 depicts a view of the image 100 with the trap 150 having a varying thickness 152 around the object 110, according to one or more embodiments disclosed. The measured thicknesses 130-1, 130-2, 130-3 of the object 110 may be used to vary the thickness 152 of the trap 150 around the border of the object 110, as at 310 in FIG. 3. More particularly, the thickness 152 of the trap 150 at a particular location may depend, at least partially, on the thickness (e.g., thickness 130-1) of the object 110 proximate to that particular location (e.g., in window 410).

If the thickness 130 of the object 110 proximate to a window (e.g., window 410) is greater or equal to than a first predetermined thickness $T_1$, then the thickness 152 of the trap 150 proximate to that particular window may be a maximum thickness $T_{max}$ selected by the user. The first predetermined thickness $T_1$ may be, for example, 4 pixels. The maximum thickness $T_{max}$ may be, for example, 4 pixels.

If the thickness 130 of the object 110 proximate to the window (e.g., window 410) is less than or equal to a second predetermined thickness $T_2$, then the thickness 152 of the trap 150 proximate to that particular window may be a minimum thickness $T_{min}$ selected by the user. The minimum thickness $T_{min}$ may be, for example, 1 pixel.

If the thickness 130 of the object 110 proximate to the window (e.g., window 410) is less than or equal to the first predetermined thickness $T_1$ and greater than or equal to the second predetermined thickness $T_2$, then the thickness 152 of the trap 150 proximate to that particular window may be greater than or equal to minimum thickness $T_{min}$ and less than or equal to the maximum thickness $T_{max}$, as determined by an algorithm. The algorithm may be or include linear mapping or a non-linear function. For example, when linear, the thickness 130 may be determined based on a slope of a line between ($T_1$, $T_{max}$) and ($T_2$, $T_{min}$).

As may be seen in FIG. 6, the thickness 152 of the trap 150 varies (e.g., between 1 pixel and 4 pixels) around the border of the object 110. The thickness 152 of the trap 150 may be greatest (e.g., $T_{max}$) around the central portion 144 of the object 110 where the thickness 130 of the object 110 is greatest. The thickness 152 of the trap 150 may taper down to the minimum thickness $T_{min}$ proximate to the ends 140, 142 of the object 110 where the thickness 130 of the object 110 is at a minimum. Varying the thickness 152 of the trap 150 may help prevent the trap 150 from "overpowering" the thinner regions (e.g., 140, 142) of the object 110 by the trap 150.

FIGS. 7-1, 7-2, and 7-3 depict views of illustrative structuring elements 710, 720, 730 that may be used in the image 100, according to one or more embodiments disclosed. The structuring elements 710, 720, and/or 730 may be used to determine the "spread" of the object 110 on the background 120. As used herein, "spread" refers to borders or edges expanded from a region of one color to another to fill the gap or misregistration border region with a color determined to minimize the visual effect when printed. The structuring elements 710, 720, and/or 730 may be selected based at least partially upon the thicknesses 130-1, 130-2, 130-3 of the object 110 (in the edge orientation directions 412, 422, 432). The dilation method may then create the spread of the object 110. The spread amount/size may be varied with respect to the structuring element 710, 720, 730, and this spread may then be the thickness 152 of the trap 150.

For example, it may be determined to spread beyond a border pixel by 3 pixels. The center pixel 712 of the structuring element 710 may need to change color to be part of the spread. If any of the marked pixels in the structuring element 710 is labelled as a border (edge) pixel with the desired trapping width of 3, then the center 712 of the structuring element 710 may change color to be part of the spread. Then the structuring elements 710, 720, and/or 730 may be slid around so that all of the pixels are examined.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 8:
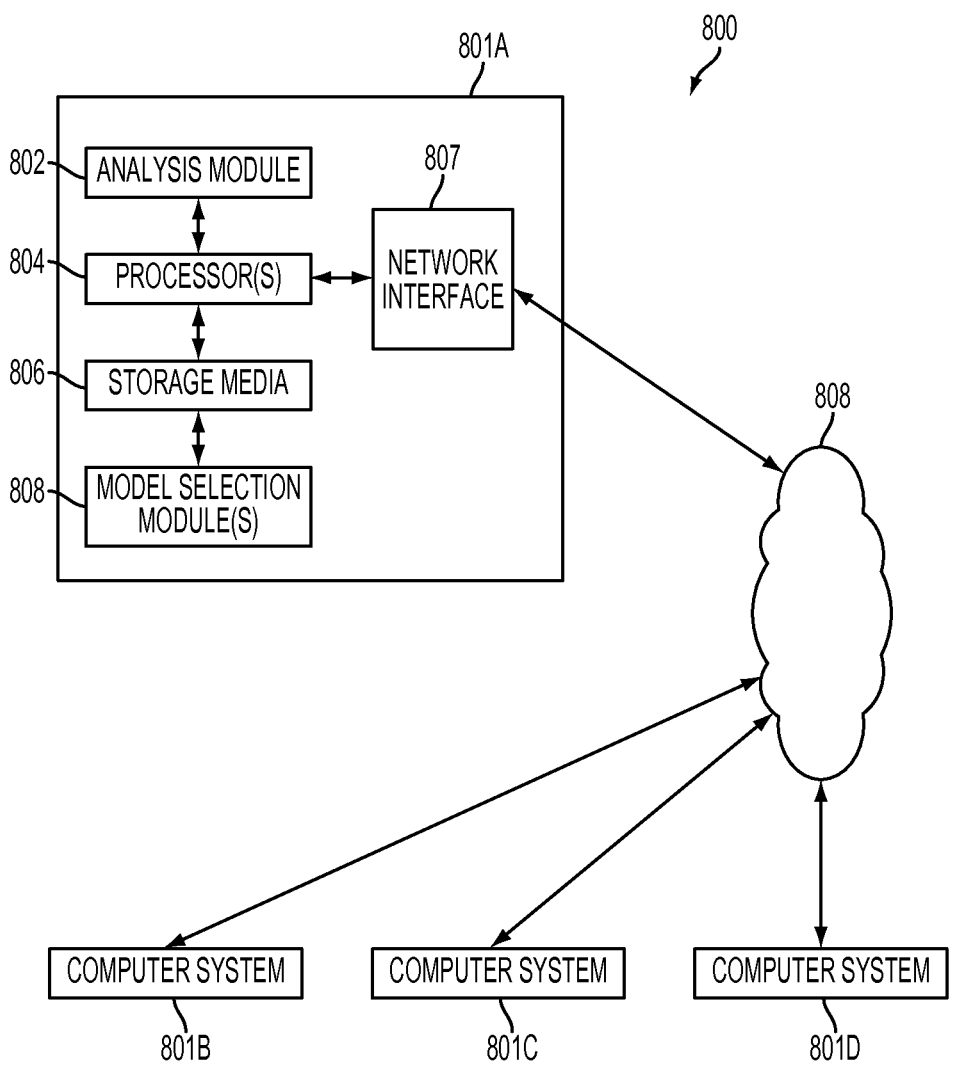
FIG. 8 illustrates a computing system for performing one or more of the methods disclosed herein, according to an embodiment.

In some embodiments, the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, such as one or more methods disclosed herein. To perform these various tasks, the analysis module 802 executes independently, or in coordination with, one or more processors 804, which is (or are) connected to one or more storage media 806A. The processor(s) 804 is (or are) also connected to a network interface 807 to allow the computer system 801A to communicate over a data network 808 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor may include a microprocessor, microcontroller, processor module or subsystem, programmable integrated circuit, programmable gate array, or another control or computing device. The storage media 806A may be implemented as one or more computer-readable or machine-readable storage media. Note that while in the example embodiment of FIG. 8 storage media 806A is depicted as within computer system 801A, in some embodiments, storage media 806A may be distributed within and/or across multiple internal and/or external enclosures of computing system 801A and/or additional computing systems. Storage media 806A may include one or more different forms of memory including semiconductor memory devices such as dynamic or static random access memories (DRAMs or SRAMs), erasable and programmable read-only memories (EPROMs), electrically erasable and programmable read-only memories (EE-PROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 800 contains one or more completion quality determination module(s) 808. In the example of computing system 800, computer system 801A includes the completion quality determination module 808. In some embodiments, a single completion quality determination module may be used to perform some or all aspects of one or more embodiments of the methods disclosed herein. In alternate embodiments, a plurality of completion quality determination modules may be used to perform some or all aspects of methods herein.

It should be appreciated that computing system 800 is only one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

What is claimed is:

1. A method for varying a thickness of a trap around an object in an image, comprising:
    selecting a first window along a border of the object, wherein the first window includes one or more first pixels representing the object and one or more second pixels representing a background or another object;
    determining a first edge orientation direction based at least partially upon a location of the one or more first pixels in the first window;
    determining a first thickness of the object along the first edge orientation direction;
    creating a trap around the object; and
    varying a first thickness of the trap proximate to the first window based at least partially upon the first thickness of the object.

2. The method of claim 1, wherein the first edge orientation direction is orthogonal to a portion of the border of the object located within the first window.

3. The method of claim 2, wherein the first edge orientation points into the object.

4. The method of claim 1, wherein the first edge orientation direction is orthogonal to a majority of surfaces of the one or more first pixels that make up the border in the first window.

5. The method of claim 1, wherein the first thickness of the trap is a predetermined maximum trap thickness when the first thickness of the object is greater than or equal to a predetermined maximum object thickness.

6. The method of claim 5, wherein the first thickness of the trap is a predetermined minimum trap thickness when the first thickness of the object is less than or equal to a predetermined minimum object thickness.

7. The method of claim 6, wherein the first thickness of the trap is variable between the predetermined maximum trap thickness and the predetermined minimum trap thickness based upon an algorithm when the first thickness of the object is less than the predetermined maximum object thickness and greater than the predetermined minimum object thickness.

8. The method of claim 1, wherein the first edge orientation is selected from the group consisting of North, South, East, West, Northeast, Northwest, Southeast, and Southwest.

9. The method of claim 1, further comprising:
    selecting a second window along the border of the object, wherein the second window includes one or more third pixels representing the object and one or more fourth pixels representing the background or another object;
    determining a second edge orientation direction based at least partially upon a location of the one or more third pixels in the second window;
    determining a second thickness of the object along the second edge orientation direction; and
    varying a second thickness of the trap proximate to the second window based at least partially upon the second thickness of the object.

10. The method of claim 9, wherein the first thickness of the trap is different than the second thickness of the trap.

11. A non-transitory computer-readable medium storing instructions that, when executed by at least one processor of a computing system, cause the computing system to perform operations, the operations comprising:
    selecting a first window along a border of the object, wherein the first window includes one or more first pixels representing the object and one or more second pixels representing a background or another object;
    determining a first edge orientation direction based at least partially upon a location of the one or more first pixels in the first window;
    determining a first thickness of the object along the first edge orientation direction;
    creating a trap around the object; and
    varying a first thickness of the trap proximate to the first window based at least partially upon the first thickness of the object.

12. The computer-readable medium of claim 11, wherein the first edge orientation direction is orthogonal to a portion of the border of the object located within the first window, and wherein the first edge orientation points into the object.

13. The computer-readable medium of claim 11, wherein the first edge orientation direction is orthogonal to a majority of surfaces of the one or more first pixels that make up the border in the first window.

14. The computer-readable medium of claim 11, wherein:
    the first thickness of the trap is a predetermined maximum trap thickness when the first thickness of the object is greater than or equal to a predetermined maximum object thickness;
    the first thickness of the trap is a predetermined minimum trap thickness when the first thickness of the object is less than or equal to a predetermined minimum object thickness; and
    the first thickness of the trap is variable between the predetermined maximum trap thickness and the predetermined minimum trap thickness based upon an algorithm when the first thickness of the object is less than the predetermined maximum object thickness and greater than the predetermined minimum object thickness.

15. The computer-readable medium of claim 11, wherein the operations further comprise:
    selecting a second window along the border of the object, wherein the second window includes one or more third pixels representing the object and one or more fourth pixels representing the background or another object;
    determining a second edge orientation direction based at least partially upon a location of the one or more third pixels in the second window;
    determining a second thickness of the object along the second edge orientation direction; and
    varying a second thickness of the trap proximate to the second window based at least partially upon the second thickness of the object, wherein the first thickness of the trap is different than the second thickness of the trap.

16. A computing system comprising:
    one or more processors; and
    a memory system comprising one or more non-transitory computer-readable media storing instructions that, when executed by at least one of the one or more processors, cause the computing system to perform operations, the operations comprising:
  selecting a first window along a border of the object, wherein the first window includes one or more first pixels representing the object and one or more second pixels representing a background or another object;
  determining a first edge orientation direction based at least partially upon a location of the one or more first pixels in the first window;
  determining a first thickness of the object along the first edge orientation direction;
  creating a trap around the object; and
  varying a first thickness of the trap proximate to the first window based at least partially upon the first thickness of the object.

17. The computing system of claim 16, wherein the first edge orientation direction is orthogonal to a portion of the border of the object located within the first window, and wherein the first edge orientation points into the object.

18. The computing system of claim 16, wherein the first edge orientation direction is orthogonal to a majority of surfaces of the one or more first pixels that make up the border in the first window.

19. The computing system of claim 16, wherein:
  the first thickness of the trap is a predetermined maximum trap thickness when the first thickness of the object is greater than or equal to a predetermined maximum object thickness;
  the first thickness of the trap is a predetermined minimum trap thickness when the first thickness of the object is less than or equal to a predetermined minimum object thickness; and
  the first thickness of the trap is variable between the predetermined maximum trap thickness and the predetermined minimum trap thickness based upon an algorithm when the first thickness of the object is less than the predetermined maximum object thickness and greater than the predetermined minimum object thickness.

20. The computing system of claim 16, wherein the operations further comprise:
  selecting a second window along the border of the object, wherein the second window includes one or more third pixels representing the object and one or more fourth pixels representing the background or another object;
  determining a second edge orientation direction based at least partially upon a location of the one or more third pixels in the second window;
  determining a second thickness of the object along the second edge orientation direction; and
  varying a second thickness of the trap proximate to the second window based at least partially upon the second thickness of the object, wherein the first thickness of the trap is different than the second thickness of the trap.

* * * * *